United States Patent [19]

Chung et al.

[11] Patent Number: 5,066,688
[45] Date of Patent: Nov. 19, 1991

[54] CATHODIC ELECTRODEPOSITION COATINGS CONTAINING A REACTIVE ADDITIVE

[75] Inventors: Ding Y. Chung, Rochester Hills; Tapan K. Debroy, Shelby Township, Macomb County; Sioe-Heng A. Tjoe, Troy, all of Mich.

[73] Assignee: E. I. Du Pont de Nemours and Company, Wilmington, Del.

[21] Appl. No.: 683,051

[22] Filed: Apr. 10, 1991

[51] Int. Cl.$^5$ .................. C08G 59/40; C09D 5/44
[52] U.S. Cl. ........................... 523/415; 528/45
[58] Field of Search ................... 523/415; 528/45

[56] References Cited

U.S. PATENT DOCUMENTS

| | | | |
|---|---|---|---|
| 3,922,253 | 11/1975 | Jerabek et al. | 260/77.5 TB |
| 4,137,140 | 1/1979 | Belanger | 204/181 C |
| 4,314,918 | 2/1982 | Birkmeyer et al. | 528/45 |
| 4,343,925 | 8/1982 | Chang et al. | 528/45 |
| 4,419,467 | 12/1983 | Wismer et al. | 523/414 |
| 4,468,307 | 8/1984 | Wismer et al. | 204/181 C |
| 4,751,257 | 6/1988 | Tominaga | 528/111 |

OTHER PUBLICATIONS

Union Carbide Product Information UCAR® Reactive Diluent RD65-2.

Primary Examiner—Paul R. Michl
Assistant Examiner—Christopher P. Rogers
Attorney, Agent, or Firm—Hilmar L. Fricke

[57] ABSTRACT

An improved aqueous electrocoating composition that contains a reactive additive of the following formula

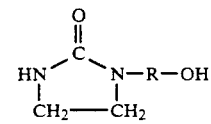

wherein R is an aliphatic hydrocarbon group; finishes formed from the composition have improved cure and chip resistance.

10 Claims, No Drawings

CATHODIC ELECTRODEPOSITION COATINGS CONTAINING A REACTIVE ADDITIVE

BACKGROUND OF THE INVENTION

This invention is directed to a cathodic electrocoating composition and in particular to a cathodic electrocoating composition containing a reactive additive which reduces the VOC (volatile organic content) of the composition and upon curing of the composition reacts with other constituents in the composition and improves the rate of cure of the composition and chip resistance of the resulting finish.

The coating of electrically conductive substrates by an electrodeposition process (also called an electrocoating process) is a well known and important industrial process. Electrodeposition of primers to automotive substrates is widely used in the automotive industry. In this process, a conductive article, such as an autobody or an auto part, is immersed in a bath of a coating composition of an aqueous emulsion of film forming polymer and acts as an electrode in the electrodeposition process. An electric current is passed between the article and a counter-electrode in electrical contact with the aqueous emulsion, until a desired coating is deposited on the article. In a cathodic electrocoating process, the article to be coated is the cathode and the counter-electrode is the anode.

Resin compositions used in the bath of a typical cathodic electrodeposition process also are well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at sufficient temperature to produce a crosslinked finish on the article.

Cathodic electrocoating compositions and resin compositions, coating baths, and cathodic 25 electrodeposition processes are disclosed in Jerabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979 and Wismer et al U.S. Pat. No. 4,468,307 issued Aug. 25, 1984.

It would be desirable to formulate a cathodic electrocoating composition that has a reduced VOC, forms finishes that cure rapidly, are smooth and have improved chip resistance. The addition of a reactive additive to a cathodic electrocoating composition achieves the above.

SUMMARY OF THE INVENTION

An improved aqueous electrocoating composition having a binder of an epoxy-amine adduct and a blocked polyisocyanate crosslinking agent; wherein the improvement is a reactive additive of the following formula

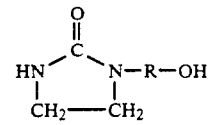

wherein R is an aliphatic hydrocarbon group.

DETAILED DESCRIPTION OF THE INVENTION

The reactive additive is readily incorporated into the electrocoating composition since it is compatible with the other constituents of the composition. The reactive additive remains stable in the composition and in the electrocoating bath for extended periods of time under conventional bath operating conditions. The reactive additive aids in flow of coatings form by electrodeposition to form smooth finishes, improves cure of the finish and improves the chip resistance of the finish. Not all the reactions are known which occur on curing of the finish but it is speculated that the reactive additive reacts with the isocyanate after it is unblocked to improve curing and chip resistance of the resulting electrodeposited finish.

The reactive additive is used in the electrocoating composition at a level of least 1% by weight, based on the total weight of resin solids in the electrocoating composition and preferably, the reactive additive is used at a level of about 1-10% by weight. More preferably, about 1-3% by weight of the additive is used.

The reactive additive has the following formula

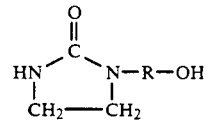

wherein R is an aliphatic hydrocarbon group. Preferably, R is as follows

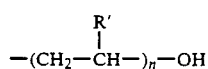

where R' is H or $CH_3$ and n is 1-10.

The following are typically useful reactive additives having the above formula: hydroxy alkyl ethylene ureas preferably having 1-6 carbon atoms in the alkyl group such as hydroxy methyl ethylene urea, hydroxy ethyl ethylene urea, hydroxy propyl ethylene urea, hydroxy butyl ethylene urea, hydroxy hexyl ethylene urea and the like. One particularly preferred reactive additive is hydroxy ethyl ethylene urea which is sold as "UCAR" Reactive Diluent RD 65-2 which is made by Union Carbide Corporation Solvents & Coating Divisions.

Most principal emulsions used in an electrocoating composition comprise an aqueous emulsion of an epoxy amine adduct blended with a cross-linking agent which has been neutralized with an acid to form a water soluble product. Generally, an alkyl tin diacetyl acetonate catalyst is added to a blend of the epoxy amine adduct and crosslinking agent before water is added to form an emulsion. The catalyst is added in solution and mixed with the blend of epoxy amine adduct and crosslinking agent.

The reactive additive can be added to the electrocoating composition at almost anytime. It can be added to the principal emulsion, to the bath or to the pigment paste used to form the electrocoating composition.

The reactive additive is potentially usable with a variety of different cathodic electrocoat resins, but the preferred resin is the typical epoxy-amine adduct of the prior art. These resins are generally disclosed in U.S. Pat. No. 4,419,467 which is incorporated herein by reference.

Preferred crosslinkers for the above binder resins are also well known in the prior art. These are aliphatic, cycloaliphatic and aromatic isocyanates such as hexamethylene diisocyanate, cyclohexamethylene diisocyanate, toluene diisocyanate, methylene diphenyl diisocyanate and the like. These isocyanates are pre-reacted with a blocking agent such as oximes, alcohols, and caprolactams which block the isocyanate functionality i.e. the crosslinking functionality. Upon heating the blocking agents separate, thereby providing a reactive isocyanate group and crosslinking occurs. Isocyanate crosslinkers and blocking agents are well known in the prior art and also are disclosed in the aforementioned U.S. Pat. No. 4,419,467.

The cathodic binder resin of the epoxy amine adduct and the blocked isocyanate are the principal resinous ingredients in the electrocoating composition and are usually present in amounts of about 30 to 50 percent by weight of solids.

Besides the binder resin described above, the electrocoating composition usually contains pigment which is incorporated into the composition in the form of a pigment paste. The pigment paste is prepared by grinding or dispersing a pigment into a grinding vehicle and optional ingredients such as wetting agents, surfactants, and defoamers. Any of the pigment grinding vehicles that are well known in the art can be used. After grinding, the particle size of the pigment should be as small as practical, generally, the particle size is about 6–8 using a Hegman grinding gauge.

Pigments which can be used in this invention include titanium dioxide, basic lead silicate, strontium chromate, carbon black, iron oxide, clay and the like. Pigments with high surface areas and oil absorbencies should be used judiciously because these can have an undesirable affect on coalescence and flow of the electrodeposited coating.

The pigment to binder weight ratio is also important and should be preferably less than 0.5:1, more preferably less than 0.4:1, and usually about 0.2 to 0.4:1. Higher pigment to binder weight ratios have also been found to adversely affect coalescence and flow.

The coating compositions of the invention can contain optional ingredients such as wetting agents, surfactants, wetting agents defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0.1 to 20 percent by weight of binder solids of the composition.

Optionally, plasticizers can be used to promote flow. Examples of useful plasticizers are high boiling water immiscible materials such as ethylene or propylene oxide adducts of nonyl phenols or bisphenol A. Plasticers are usually used at levels of about 0.1 to 15 percent by weight resin solids.

The electrocoating composition of this invention is an aqueous dispersion. The term "dispersion" as used within the context of this invention is believed to be a two-phase translucent or opaque aqueous resinous binder system in which the binder is in the dispersed phase and water the continuous phase. The average particle size diameter of the binder phase is about 0.1 to 10 microns, preferably, less than 5 microns. The concentration of the binder in the aqueous medium in general is not critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

Besides water, the aqueous medium generally contains a coalescing solvent or solvents. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0.1 to 15 percent by weight, preferably about 0.5 to 5 percent by weight based on total weight of the resin solids.

The following example illustrates the invention. All parts and percentages are on a weight basis unless otherwise indicated.

EXAMPLE

Preparation of Chain Extended Polyepoxide

The following ingredients were charged into a suitable reaction vessel: 1478 parts Epon 828 ® (epoxy resin of diglycidyl ether of Bisphenol A from Shell Chemical Company having an epoxy equivalent weight of 188); 533 parts ethoxylated Bisphenol A having a hydroxy equivalent weight of 247 (Synfac 8009 ® from Milliken Company); 427 parts of Bisphenol A; and 121 parts xylene. The resulting reaction mixture was heated to 160° C. under a nitrogen blanket and held at this temperature for 1 hour. 5.1 parts dimethyl benzyl amine were added and the mixture was held at 147° C. until a 1150 epoxy equivalent weight was obtained. The reaction mixture was cooled to 98° C. and 168 parts of diketimine (reaction product of dithylenetriamine and methyl isobutyl ketone at 72.7% solids) and 143 parts of methyl ethanol amine were added. The resulting mixture was held at 120.C for 1 hour and then 727 parts of methyl isobutyl ketone were added. The resulting resin solution had a non-volatile content of 75%.

Preparation of Flex Emulsion Additive

A flex emulsion additive was prepared by charging 2322 parts of Jeffamine D-2000 ® (polyoxypropylenediamine having a molecular weight of 1992 from Texaco Company) to a reaction vessel under a nitrogen atmosphere and heated to 90° C. A solution of 859 parts of Epon 1001 ® (polyglycidyl ether of Bisphenol A having an epoxy equivalent weight of 500 from Shell Chemical Company) in 345 parts of 2-butoxyethanol was added. An aqueous dispersion was formed by adding 68 parts of acetic acid and 5345 parts of deionized water.

Preparation of Quaternizing Agent

|  | Parts by Weight | NV* |
|---|---|---|
| Blocked Isocyanate Solution (2-Ethylhexanol half capped toluene diisocyanate in methyl isobutyl ketone) | 320.0 | 304.0 |
| Dimethylethanol amine | 87.2 | 87.2 |
| Aqueous lactic acid solution | 117.6 | 88.2 |
| 2-Butoxyethanol | 39.2 |  |
| Total | 564.0 | 479.4 |

*Non-Volatiles

The quaternizing agent was prepared by adding dimethylethanol amine to the blocked isocyanate solution in a suitable reaction vessel at ambient temperature. An exothermic reaction occurs and the reaction mixture was stirred for one hour and held at a temperature of 80° C. Lactic acid solution was added followed by the addition of 2-butoxyethanol. The reaction mixture was stirred for an additional hour at 65° C. to form the quaternizing agent.

Preparation of Pigment Grinding Vehicle

|  | Parts by Weight | NV* |
|---|---|---|
| "Epon 829" (epoxy resin of diglycidyl ether of Bisphenol A from Shell Chemical Company having an epoxy equivalent weight of 192-203) | 710.0 | 682.0 |
| Bisphenol A | 289.6 | 289.6 |
| Blocked isocyanate solution (described above) | 406.0 | 386.1 |
| Quaternizing Agent (prepared above) | 496.3 | 421.9 |
| Deionized water | 71.2 |  |
| 2-Butoxyethanol | 1095.2 |  |
| Total | 3068.3 | 1779.6 |

Epon 829 ® and Bisphenol A were charged under a nitrogen atmosphere to a suitable reaction vessel and heated to 150°-160° C. to initiate an exothermic reaction. The reaction mixture was cooled to 120° C. and the blocked isocyanate solution was added. The temperature of the reaction mixture was held at 110-120° C. for one hour, followed by the addition of 2-butoxyethanol. The reaction mixture then was cooled to 85°-90° C., homogenized and then the deionized water was added followed by the addition of the Quaternizing agent. The resulting mixture had a solids content of about 58%.

Preparation of Emulsion

|  | Parts by Weight | NV |
|---|---|---|
| Chain Extended Polyepoxide (prepared above) | 3210 | 2440 |
| Crosslinking Resin Solution[1] | 2229 | 1560 |
| Downol PPH ® (from Dow Chemical Co.) | 40 |  |
| Surfactant[2] | 60 |  |
| Deionized water | 5392 |  |
| Lactic acid | 137 |  |
| Flex emulsion additive (prepared above) | 964 | 347 |
| Total | 12032 | 4347 |

[1]Crosslinking resin solution is formed from half-capping toluene diisocyanate (80/20 2,4/2,6 isomer mixture) with 2-hexyloxy ethanol and reacting the resulting product with trimethylol propane in a 3:1 molar ratio in methyl isobutyl ketone to form a 70% solids solution.
[2]Surfactant is a mixture of 120 parts Amine C from Ciba-Geigy, 120 parts acetylenic alcohol, commercially available as Surfynol 104 ®, 120 parts of 2-butoxy ethanol and 221 parts by weight of deionized water and 19 parts glacial acetic acid.

The chain extended polyepoxide is thoroughly mixed with the crosslinking resin solution, Downol PPH ®, lactic acid and the surfactant. Deionized water was added under agitation to form a dispersion and then the flex emulsion additive as blended into the resulting composition. The resulting dispersion has a solids content of 36% and a pH of 6.8.

Preparation of Pigment Paste

|  | Parts by Weight | NV |
|---|---|---|
| Pigment Grinding Vehicle (prepared above) | 266.20 | 154.64 |
| Deionized water | 455.30 |  |
| Carbon black pigment dispersion | 25.98 | 5.98 |
| Aluminum silicate pigment | 51.85 | 51.85 |
| Lead silicate pigment dispersion | 22.24 | 2.24 |
| Dibutyl tin oxide | 16.34 | 16.34 |
| Titanium dioxide pigment | 296.23 | 296.23 |
| Total | 1134.14 | 567.28 |

The above constituents were charged into a conventional sand mill and ground to a No. 7 Hegman fineness.

Preparation of an Electrocoating Baths

|  | Parts by Weight | |
|---|---|---|
|  | Bath No. 1 | Bath No. 2 |
| Emulsion (prepared above) | 1689 | 1646 |
| Pigment Paste (prepared above) | 418 | 419 |
| Deionized water | 1893 | 1915 |
| Reactive additive (UCAR ® RD-65-2 previously described herein) |  | 20 |
| Total | 4000 | 4000 |

Electrocoating baths were prepared by blending the above ingredients together. Two sets of two zinc phosphate coated cold-rolled steel panels were each cathodically electrocoated in each bath at 275 volts for 2 minutes at a bath temperature of 28° C. One set of coated panels was bake at 160° C. for 15 minutes and the other set of panels was baked at 182° C. for 15 minutes.

One set of panels from each bath was tested for solvent resistance. The panels were double rubbed with a cloth soaked in methyl ethyl ketone and the number of rubs were counted before there was damage to the coating. The results are as follows:

| Solvent Resistance | Bath No. 1 | Bath No. 2 |
|---|---|---|
| Bake Temp. 160° C. | 38 | 51 |
| Bake Temp. 182° C. | >100 | >100 |

The second set of panel from each bath was coated with a primer surfacer and topcoated and chip resistance was measured using a standard gravelometer. The results are determined as the percentage of paint area lost after being subjected to the gravelometer and are as follows:

| Chip Resistance | Bath No. 1 | Bath No. 2 |
|---|---|---|
| Bake Temp. 160° C. | 2% | 1% |
| Bake Temp. 182° C. | 1% | 1% |

The above results show that the reactive additive which was present in Bath No. 2 improves solvent resistance and chip resistance at lower baking temperatures which are commonly used in an automotive assembly line.

We claim:

1. In a cathodic electrocoating composition, comprising an aqueous carrier having dispersed therein a film forming binder comprising an epoxy-amine adduct and a blocked polyisocyanate crosslinking agent; wherein the improvement comprises a reactive additive of the formula

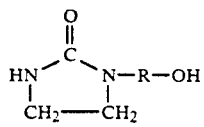

wherein R is an aliphatic hydrocarbon group.

2. The cathodic electrocoating composition of claim 1 wherein R is

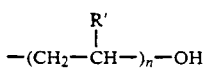

where R' is H or CH$_3$ and n is 1-10.

3. The cathodic electrocoating composition of claim 1 wherein the reactive additive is present in an amount of about 1-10% by weight, based on the weight of the film forming binder of the composition.

4. The cathodic electrocoating composition of claim 3 wherein the reactive additive consists of hydroxy alkyl ethylene urea wherein the alkyl group has 1-6 carbon atoms.

5. The cathodic electrocoating composition of claim 4 wherein the reactive additive consist essentially of hydroxy ethyl ethylene urea.

6. In a method of preparing a cathodic electrocoating composition comprising the following steps in any workable order:
   (a) preparing an epoxy-amine adduct;
   (b) preparing a blocked polyisocyanate crosslinking agent;
   (c) blending the epoxy amine adduct with the blocked polyisocyanate crosslinking agent;
   (d) neutralizing the epoxy-amine adduct with an organic acid to form an emulsion;
   (e) blending the emulsion with a pigment paste; and
   (e) adding a reactive additive to the electrocoating composition to improve cure and chip resistance of electrodeposited coating of the composition; wherein the reactive additive comprises a composition of the formula

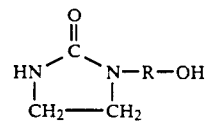

wherein R is an aliphatic hydrocarbon group.

7. The method of claim 6 wherein R of the reactive additive is

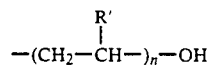

where R' is H or CH$_3$ and n is 1-10.

8. The method of claim 6 wherein the reactive additive is present in an amount of about 1-10% by weight, based on the weight of the film forming constituents of the composition.

9. The method of claim 8 wherein the reactive additive consists of hydroxy alkyl ethylene urea wherein the alkyl group has 1-6 carbon atoms.

10. The method of claim 9 wherein the reactive additive consist essentially of hydroxy ethyl ethylene urea.

* * * * *